(12) United States Patent
Chang et al.

(10) Patent No.: US 6,952,781 B1
(45) Date of Patent: Oct. 4, 2005

(54) SECURITY SERVER TOKEN CACHING

(75) Inventors: Benjamin Ma Chang, Newport Beach, CA (US); David J. Guenther, Newport Coast, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/806,724

(22) Filed: Mar. 22, 2004

Related U.S. Application Data

(63) Continuation of application No. 09/379,754, filed on Aug. 24, 1999, now Pat. No. 6,715,082.

(60) Provisional application No. 60/116,203, filed on Jan. 14, 1999.

(51) Int. Cl.[7] ............................................. G06F 01/26
(52) U.S. Cl. ....................... 713/201; 713/160; 713/168; 713/170; 713/172; 713/185
(58) Field of Search ................. 713/201, 160, 713/168, 170, 172, 185

(56) References Cited

U.S. PATENT DOCUMENTS

| | | | |
|---|---|---|---|
| 5,237,614 A | * | 8/1993 | Weiss .......................... 713/159 |
| 5,638,448 A | * | 6/1997 | Nguyen ........................ 380/29 |
| 5,754,841 A | * | 5/1998 | Carino, Jr. ..................... 707/3 |
| 5,794,250 A | * | 8/1998 | Carino et al. .................. 707/9 |

* cited by examiner

*Primary Examiner*—Thomas R. Peeso
(74) *Attorney, Agent, or Firm*—Hickman Palermo Truong & Becker LLP

(57) ABSTRACT

A mechanism for establishing a plurality of sessions between a client and a first server based on a single input of user authenticating information is disclosed. A request to establish a connection between the client and the first server is received. The request includes identification information for authenticating a requesting user. Based on the identification information, a determination is made as to whether the connection between the client and the first server should be established. If it is determined that the connection between the client and the first server should be established, the identification information is cached in memory and the connection between the client and the first server is allowed to be established. Subsequent connection requests from the same client are authenticated, and further connections can be established, based on the cached identification information, without further input from the client or user.

42 Claims, 7 Drawing Sheets

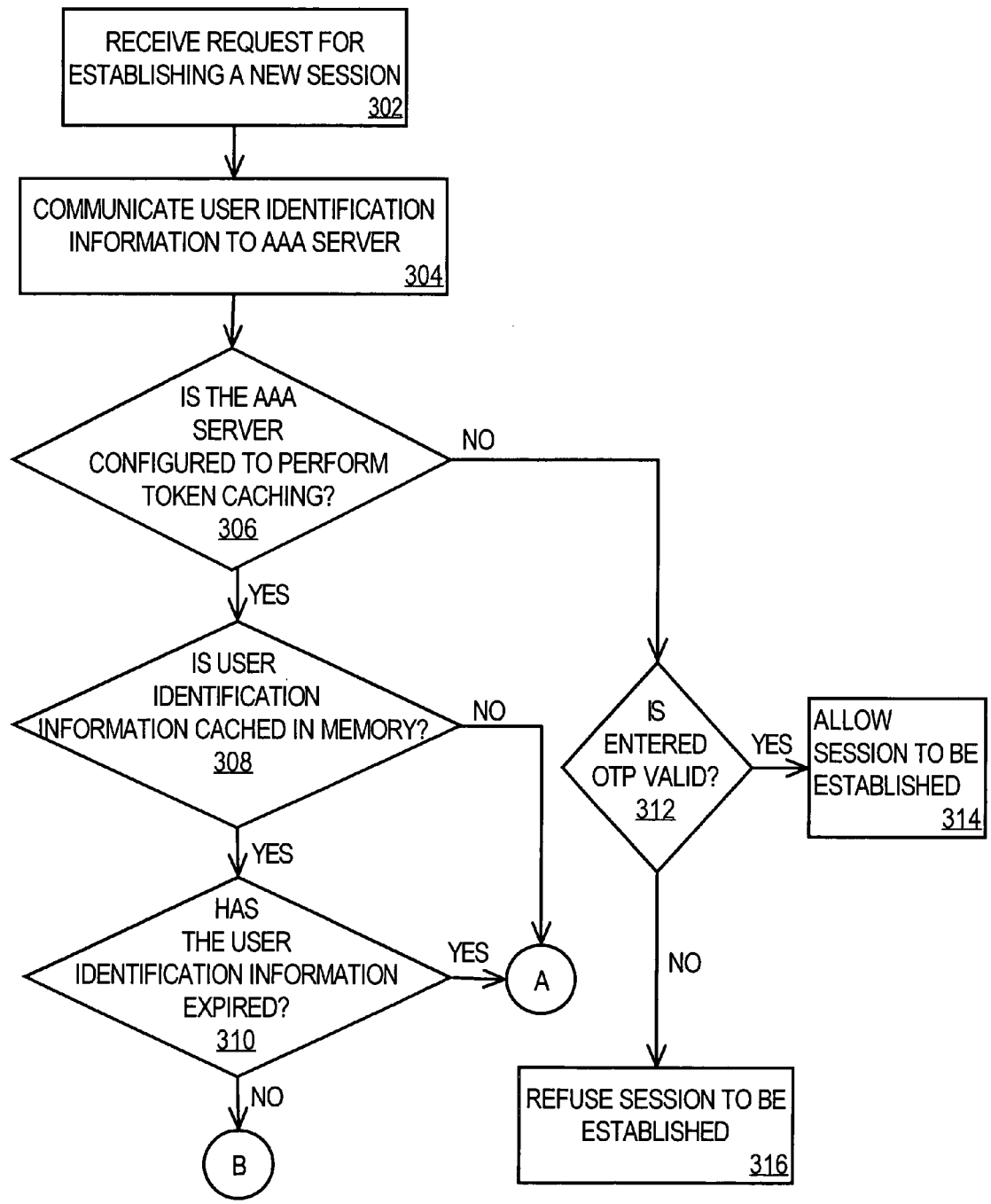

SECURITY SERVER TOKEN CACHING

CROSS-REFERENCE TO RELATED APPLICATIONS

This application is a continuation of and claims priority from U.S. application Ser. No. 09/379,754 filed Aug. 24, 1999 now U.S. Pat. No. 6,715,082 and entitled "Security Server Token Caching", which claims priority from U.S. Provisional Application No. 60/116,203 filed on Jan. 14, 1999 and entitled "Security Server Token Caching"; both which are incorporated by reference in their entirety for all purposes as if fully set forth herein.

FIELD OF THE INVENTION

The present invention generally relates to management of computer networks, and relates specifically to validating connections to a network system.

BACKGROUND OF THE INVENTION

A network system generally includes a number of network devices, such as switches, routers, and others, connected so as to allow communication among the devices and end station devices such as desktop machines, servers, hosts, printers, fax machines, and others. Many companies have a desire to provide remote access to their computer networks. By allowing remote access, individuals can connect to the computer network to use it to work and obtain resource information while located at a remote site.

A popular method of providing remote access to a network is through the use of a dial-in network access server (NAS) that controls access to the network. For example, the server model AS5300, commercially available from Cisco Systems, Inc., can be used to provide dial-in access to a company's network. Individuals can access the network system by dialing into the network access server from a Remote Node to establish a connection. In this document, the term Remote Node refers to a client device such as a personal computer (PC) or router that can be used to dial in and establish a connection with a network access server. A client/server relationship exists between the Remote Node (client) and the network access server (server).

A drawback associated with providing remote access to a company's network system is that unauthorized individuals can sometimes gain access to the network system, thus potentially allowing the company's resources and information to be accessed, used or compromised. To prevent unauthorized network access, a remote user is generally required to enter "user identification information" to remotely connect and access the network system. Most often, the user identification information is in the form of a username and password that requires authentication before a remote connection is established.

For example, when a user attempts to remotely log into a system, the user is typically required to supply a set of "fixed" user identification information in the form of a username and password that is used by the network access server to identify the requesting user. If the user is using a "hands on" remote device having a display and input device, such as a PC, the network access server may cause a login window to be displayed on the monitor of the PC. The user is then required to enter their username and password in order to establish a connection between the network access server and the remote node. Based on the supplied username and password, the network access server can determine whether a connection should be established between the network access server and the remote node.

A drawback with using fixed user identification information is that poises a significant security risk in allowing remote access to the network system. For example, certain client software permits a user to select a "save password" button, which causes the client to save the client access information so that the user does not have to enter the client access information every time the user dials in to the network access server. However, if the individual's client computer is stolen, an unauthorized user may potentially dial in and connect to the network access server, thus compromising the information and resources that are accessible through the network access server.

One method of reducing the security risks that are introduced by fixed user identification information is through the use of a Smart card or Token card. One type of Token card, the SecurID card commercially available from Security Dynamics, Inc., continually generates a series of random one-time passwords (OTPs) that can be used once to login into a network access server. The Token card works in conjunction with a password server, such as Security Dynamics' ACE password server, and generates a response that is unique for every login. Because the password server generates a unique response for every login attempt, the OTP may only be used once to establish a session. Thus, even if monitored or stolen, the one-time password cannot be reused by an intruder to gain access to a user's account.

To use the Token card, the user typically enters a series of digits and letters displayed on the token-card in the prompt window or inserts the card into a reader that is coupled to the Remote Node. The password server internally generates OTPs in synch with the card. The OTP is then used to verify that the user is allowed to log into the network access server through the remote device to access the network system by comparing the card password to the password server's password at a particular instant in time.

Token cards can provide a greater level of security as the password is only valid for a single session. For example, if a Token card is used to provide the user identification information, even if an individual's computer is stolen, an unauthorized user will not be able to log into the network access server and gain access to the network system without also obtaining the Token card.

In addition, many home office users have begun using access router devices, such as router models 1004 and 1604 commercially available from Cisco Systems Inc., to remotely connect to a company's network access server. Access routers are "hands-off" devices that have no display device and therefore cannot display a login window for the user to enter user access information. Instead, the user is required to provide the user access information through an alternative means such as a Token card. Passwords are statically configured or stored in the router.

However, a drawback with using OTPs is that additional connections that are made by a user that is currently connected to the network access server are treated as separate connections. Thus, to establish a second session between the remote node and the network access server, the user is required to reenter valid user identification information a second time. Because the OTP is only valid "once", the user must again use the token card to obtain another OTP that can be used to validate the second connection.

For example, consider the situation of a small office or home office user who uses a client that communicates with a network using an Integrated Services Digital Network (ISDN) line having first and second bearer (data) channels.

Normally the client connects to a network, ISP, or server using only the first data channel and using the access procedure described above. If an additional connection is made, for example, by activating the second ISDN channel to accommodate a large data transfer, the user is required to enter valid client access information to establish the second connection.

However, requiring user identification information to be entered whenever an additional connection is made can be both irritating and burdensome since the user must again use the Token card to provide another valid OTP for the additional connection. Similarly, Point-to-Point Protocol (PPP) or the Serial Line Internet Protocol (SLIP) users having multiple connections (for example, PPP Multi-link connections) may experience the same inconvenience.

Based on the foregoing, there is a clear need for an enhanced password security system that allows additional connections to be established for a particular user without requiring the user to enter additional access information. There is also a need for a mechanism that provides for the use of Token cards with hands-off devices, such as routers and other devices.

SUMMARY OF EMBODIMENTS OF THE INVENTION

In one aspect, a method for establishing sessions between a client and a first server is disclosed. The method comprises the steps of receiving a request to establish a session between the client and the first server, wherein the request includes identification information for authenticating a requesting user; determining, based on the identification information, whether the session between the client and the first server should be established; if the session between the client and the first server should be established, caching the identification information in memory; and establishing the session between the client and the first server.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a flow diagram that illustrates steps involved in a method of validating one or more sessions to a network access server;

DETAILED DESCRIPTION OF EMBODIMENTS OF THE INVENTION

A method and apparatus for validating access to a network system is disclosed. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

In one embodiment, a Smart card or Token card is used to obtain an OTP that can be used to establish a session with the network access server. In response to entering the username and one-time password, a user authorization phase is performed to determine whether a session should be established for the particular user. To perform the user authorization phase, the network access server forwards the username and one-time password to an authorization, authentication, and accounting (AAA) server to request authorization for establishing a session. The AAA server determines whether the username and OTP were previously cached in its memory and if so, whether the username and OTP are still valid.

If the AAA server determines that the username and OTP were previously cached in memory and that the username and OTP are still valid, the AAA server notifies the network access server that a session can be established with the particular client. In certain embodiments, the AAA server uses the username to identify a set of access rights that is used by the network access server in determining the functions and operations that may be performed by the user during the lifetime of the session. In one embodiment, upon determining that the username and OTP information is valid, the AAA server transmits the set of access rights back to the network access server. Once the network access server is notified that the session may be established, the network access server communicates with the client to establish a session with the client.

If an additional session needs to be established, the client can re-send the username and the same one-time password that was previously sent to establish the initial session. This is typically accomplished by either the user reentering the username and one-time password, or causing the client to automatically re-send the previously used username and one-time password information. In this manner, the one-time password may be used to validate multiple sessions for the same user.

Figure 1:
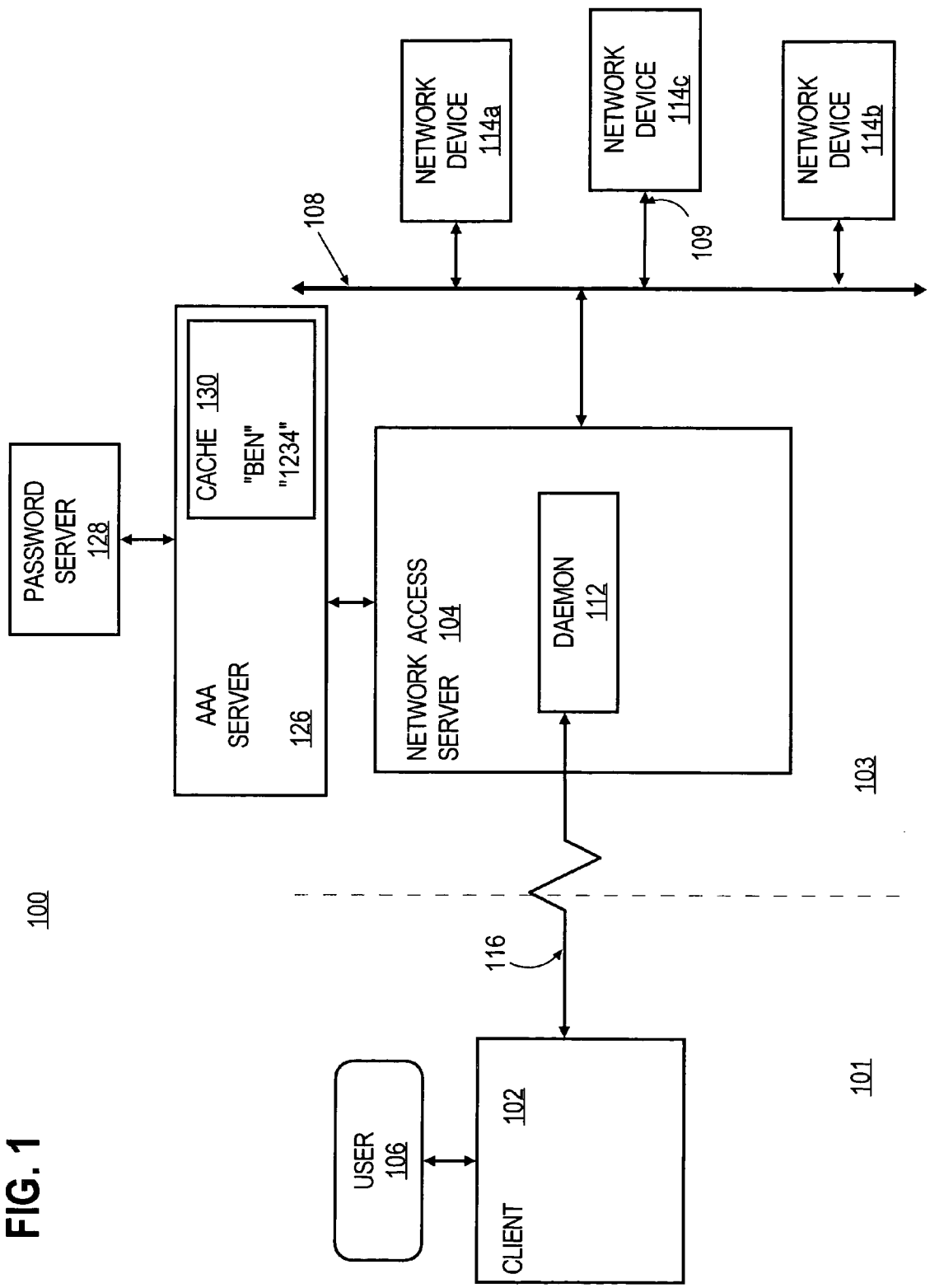
FIG. 1 is a block diagram of a computer system architecture in which the present invention may be utilized.

FIG. 1 is a block diagram of a system 100 in which the invention can be used. Generally, the system 100 includes a client 102, a network access server 104, a AAA server 126, a password server 128 and a network 108. Client 102 and network access server 104 are respectfully located in logically distinct regions 101, 103, which may be geographically separate.

The client 102 is a device, such as a workstation, personal computer (PC) or router, that is capable of dialing into the network access server 104 to establish a session 116. In one embodiment, client 102 is itself a network access server that used to establish one or more connections to the network access server 104. Client 102 is used by or associated with a user 106. Although one client 102 is shown in FIG. 1 by way of example, any number of clients can be included in the system 100, and multiple sessions 116 can be used to connect the clients to the network access server 104.

In certain embodiments, client 102 is configured with or coupled to multiple modems or ISDN bearer channels that can be used to establish one or more connections with network access server 104. In one embodiment, client 102 runs a browser application program, such as Netscape Navigator® or Microsoft Internet Explorer®. User 106 can use the browser application program to cause a connection to be established with network access server 104. Client 102 may also run a dial-up networking application program or other software components cause a dial-in connection to be established.

The network 108 is a network system comprising any number of network devices 114a, 114b, 114c interconnected by one or more communications channels 109. Ethernet, Token Ring, or other protocols can characterize the communications channels 109. Communication channels 109 may form part of a LAN or WAN.

The network access server 104 is a computer, or a group of hardware or software components or processes that cooperate or execute in one or more computer systems. The network access server 104 is coupled to the network 108 and controls remote access to the network 108 and the network devices 114a–c.

In certain embodiments, a firewall (not shown), such as the Cisco PIX Firewall, which is commercially available from Cisco Systems, Inc. may be logically interposed between the network access server 104 and network 108. The firewall may be used to control access and log-in access attempts to network 108 based on identification information that is associated with the outside communication, by intercepting all communications moving to and from the network access server 104 and determining whether to admit or block the communications. The firewall can be used to prevent unauthorized clients from connecting to network 108 and other devices that are logically behind the firewall.

The network access server 104 has a daemon 112 that can respond to a dial-in request from the client 102 to establish a connection 116 between the server 102 and the client 104. As used in this document, "daemon" generally means a program that services network requests for client authentication and authorization, verifies identities, grants or denies authorizations, and logs accounting records.

In a preferred embodiment, the session 116 is established as a Point to Point Protocol (PPP) connection. However, PPP is merely an example of a communications protocol that can be used in an embodiment. Other protocols, such as the Serial Line Internet Protocol (SLIP), that facilitate the exchange of information between a client and server can be used. PPP is described in "Understanding PPP and PPP Authentication," accessible at
http://www-fr.cisco.com/warp/public/779/smbiz/service/knowledge/wan/ppp_auth.htm.

PPP is defined in W. Simpson, "The Point-to-Point Protocol," RFC 1548, December 1993. The multipoint variant of PPP (PPP MP) is described in K. Sklower et al., "The PPP Multilink Protocol (MP)," RFC 1990, August 1996.

The Password server 128 generates synchronized one-time passwords that are used to validate the one-time passwords that are received from client 102. For example, Security Dynamics' ACE password server may be used to generate one-time passwords that are unique for every login.

The AAA server 126 interfaces with the password server 128 to authenticate the one-time passwords that are received from the different users. An example of a commercial product that is suitable for use as an AAA server is Cisco-Secure version 2.2.3 or later, which is commercially available from Cisco Systems, Inc. The AAA server may be used to interface with the password server 128 to authenticate the one-time passwords that are entered by the different users. As depicted AAA server 126 includes a cache that may be used to store username and one-time password information.

In the preferred embodiment, the network devices of network 108 run the Cisco Internetworking Operating System (IOS), and AAA server 126 is configured as a Cisco Radius Server. However, embodiments of the invention are not limited to any particular operating system or AAA server configuration. For example, embodiments of the invention may include other server types such as TACAS+, IEFT Radius or Ascend Radius.

Figure 2:
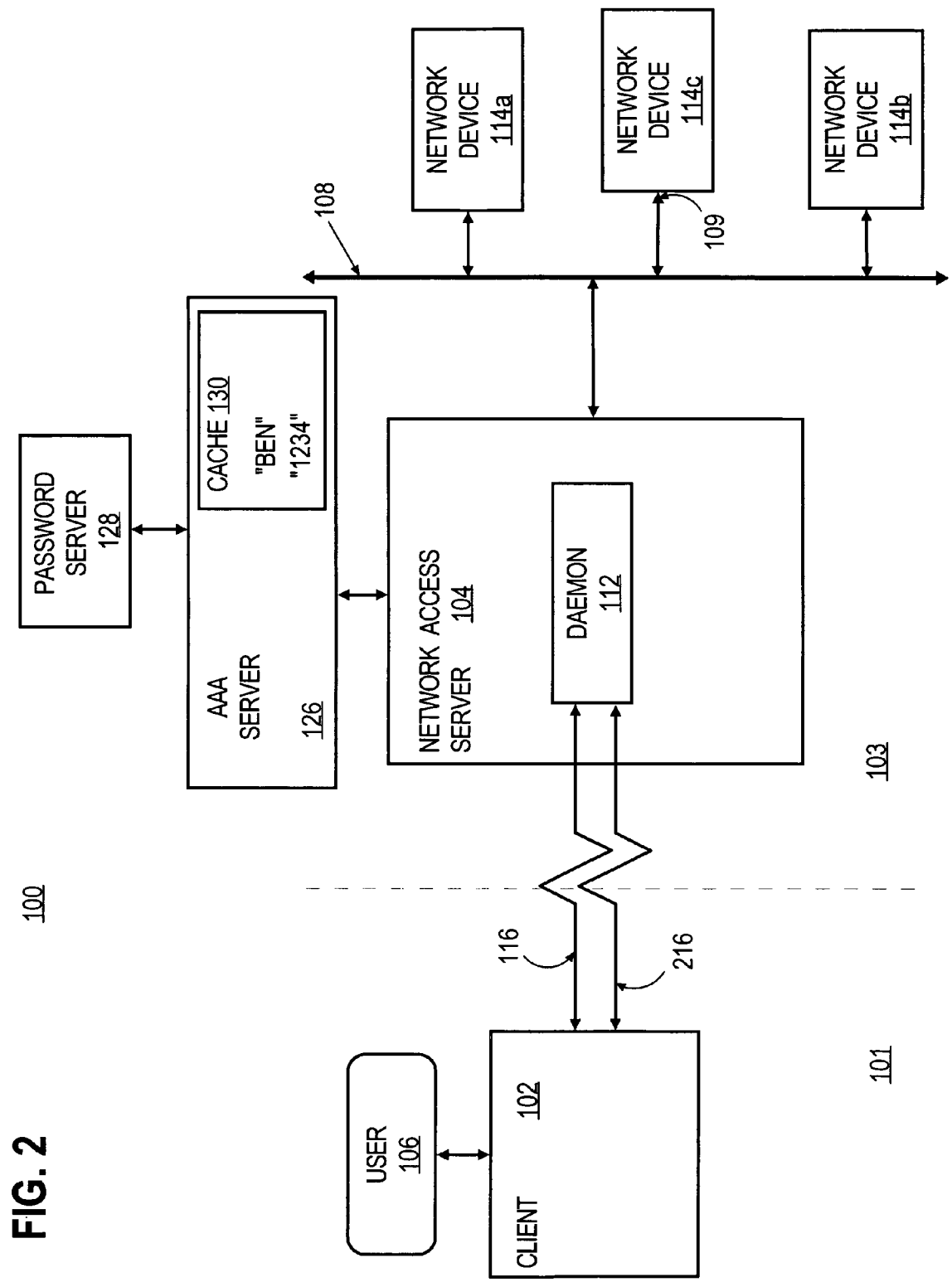
FIG. 2 is a block diagram of the system of FIG. 1 depicting the establishment of an additional session.

FIG. 2 illustrates system 100 after an additional session 216 has been established between client 102 and network access server 104. A sequence of steps for validating and establishing sessions 116 and 216 is described below.

Validating Sessions Using Token Caching

Figure 3B:
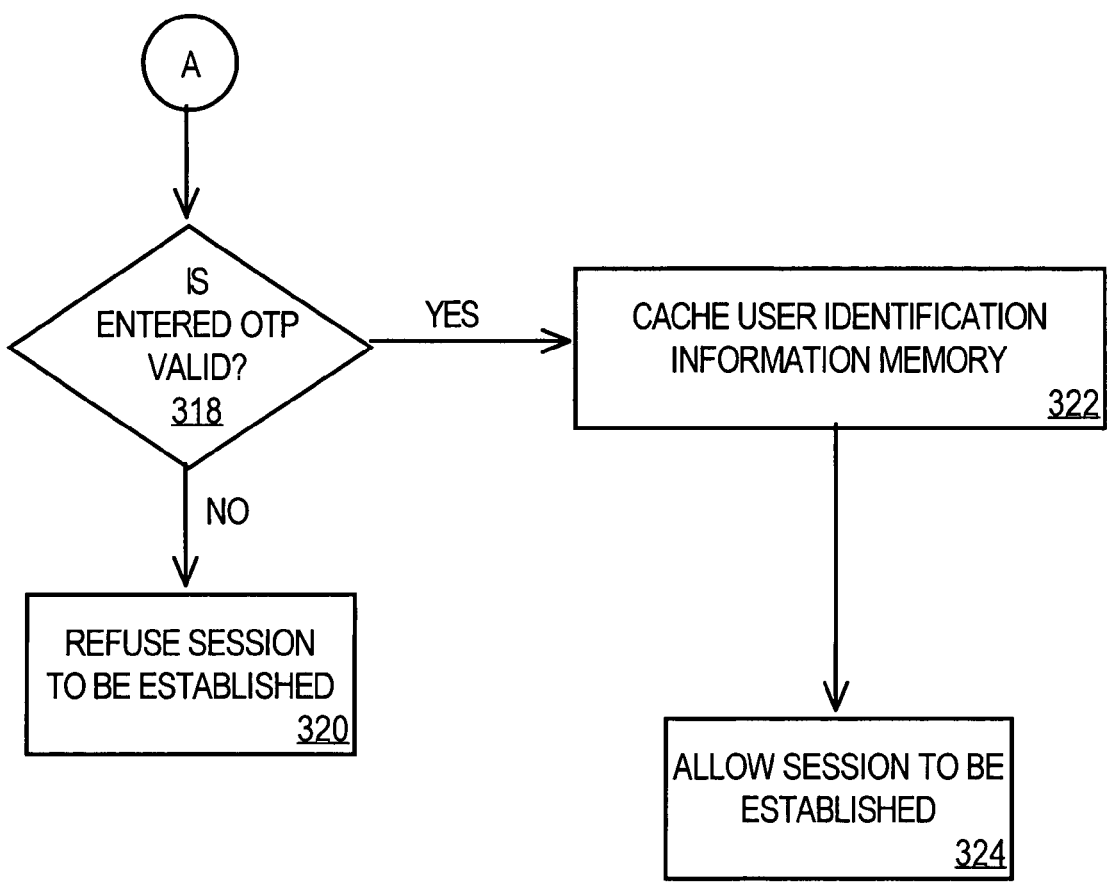
FIG. 3B is a flow diagram that illustrates further steps in the method of FIG. 3A.
Figure 3C:
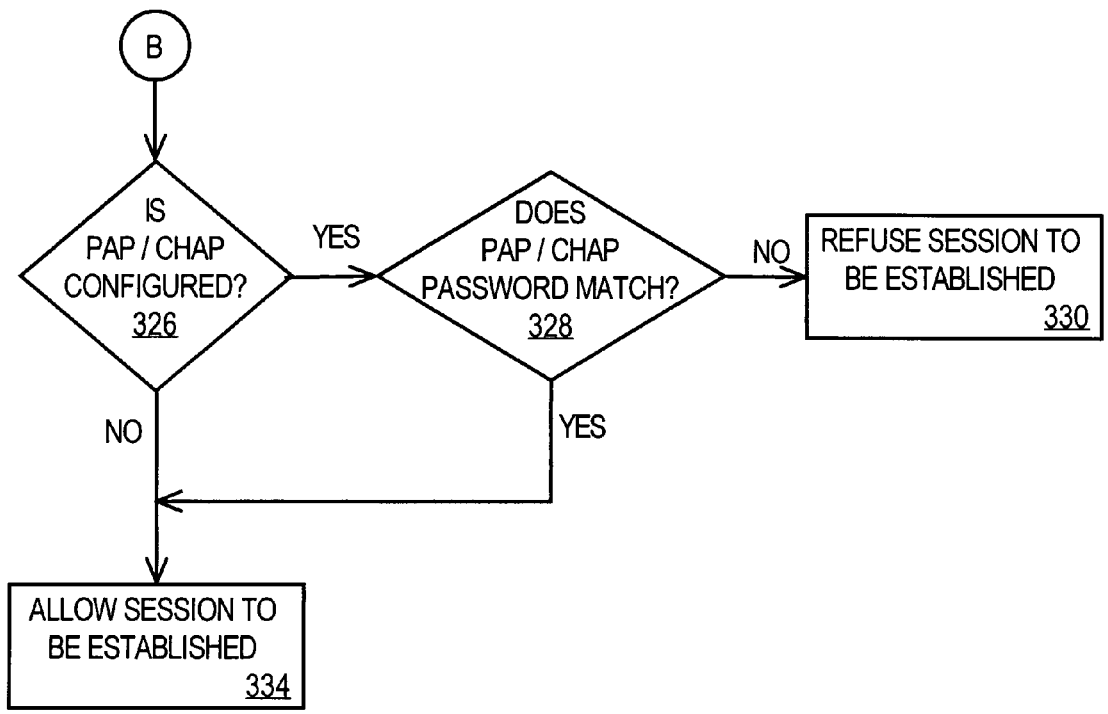
FIG. 3C is a flow diagram that illustrates further steps in the method of FIG. 3A.

FIG. 3A, FIG. 3B and FIG. 3C are flow diagrams that illustrate a method of validating one or more sessions in the foregoing context. As an example, the steps of FIG. 3A, FIG. 3B and FIG. 3C will be explained with reference to FIG. 2. For explanation purposes, connection 116 is the first or initial connection made and connection 216 is the second or additional connection made. The converse is also appropriate.

At block 302, a request is received to establish a session between network access server 104 and client 102. Block 302 and the entire process may be carried out for either a first connection or subsequent connections. In this example, the request contains user identification information that includes a username ("BEN") and an OTP ("1234").

At block 304, network access server 104 communicates with AAA server 126 to determine whether a session should be established for user 106 based on the received user identification information.

At block 306, AAA server 126 determines whether it is configured to perform token caching. If the AAA server 126 is configured to perform token caching then control proceeds to block 308. Alternatively, if the AAA server 126 is not configured to perform token caching then at block 312 the AAA server 126 communicates with password server 128 to determine whether the OTP is valid. If the OTP is found to be valid, at block 314 the AAA server 126 sends a message to network access server 104 indicating that a session can be established based on the user identification information. Conversely, if the OTP is not valid, at block 316 the AAA server 126 sends a message to network access server 104 indicating that a session can not be established based on the user identification information.

At block 308, the AAA server 126 determines whether the user identification information (username "BEN" and an OTP "1234") is cached in memory. For example, by comparing the user identification information with the information that is currently stored in cache 130, AAA server 126 can determine whether the user identification information is currently cached in memory. If no previous session has been established, then the test of block 308 will be negative. If at least one previous session has been established, then the test of block 308 will be true or affirmative. In this manner, the additional session 216 may be established without having to enter another OTP.

If the user identification information is not currently cached, control proceeds to block 318 as depicted in FIG. 3B. However, if the user identification information is currently cached, at block 310 the AAA server 126 determines whether the user identification information has expired. A method for determining whether a set of cached user identification information has expired is described further in reference to FIG. 4 below.

If at block 310 the AAA server 126 determines that the user identification information has not expired then control proceeds to block 326 as depicted in FIG. 3C.

Alternatively, if the AAA server 126 determines that the user identification information has expired, at block 318 the AAA server 126 communicates with password server 128 to determine whether the OTP is valid. If the OTP is not valid, at block 320, the AAA server 126 sends a message to network access server 104 indicating that a session can not be established based on the user identification information.

Conversely, if at block 318 the OTP is determined to be valid, at block 322 the AAA server 126 stores the username ("BEN") and OTP ("1234") in cache 130 and sends a message to network access server 104 indicating that a session may be established based on the user identification information as depicted by block 324. Although not depicted, other relevant session information may be stored within the cache 130. For example, the cache may also include such information as a NAS identifier that identifies the specific NAS that requested authorization of the session; a task_id that identifies the particular session that is established for the user, and any other pertinent session information that will allow the AAA server to determine whether a session should be allowed for the requesting user.

At block 326, the AAA server determines whether the request to establish the session was made using either the Challenge Handshake Authentication Protocol (CHAP) or the Password Authentication Protocol (PAP). Both CHAP and PAP are described in further detail below. If the request to establish the session was not made using either CHAP or PAP, control proceeds to block 334. However, if the request to establish the session was made using either CHAP or PAP, at block 328 the AAA server 126 determines whether the CHAP or PAP password is correct. If the CHAP or PAP password is not correct, at block 330 the AAA server 126 sends a message to network access server 104 indicating that a session may not be established with client 102.

Alternatively, if the CHAP or PAP password is correct, at block 334 the AAA server 126 sends a message to network access server 104 indicating that a session may be established with client 102 based on the received user identification information.

Determining Expiration of OTP

In certain embodiments, cached user identification information may expire due to the occurrence of a particular event. In a preferred embodiment, cached user identification information can expire by session, timeout or both.

For example, in one embodiment, a particular set of cached user identification information is caused to expire whenever all of a user's established PPP channels that used the OTP to connect are terminated. Table 1 illustrates an example of steps carried out by a client and AAA server to result in the expiration of user identification information due to the termination of all sessions that were previously established using the OTP ("session expiration"). In addition, a cache time-out value is set to cause the user identification information to expire (to become invalid) after a certain period of time regardless of whether any connections currently exist based on the OTP ("cache time-out").

TABLE 1

| Time | Action by user or client | Action by AAA server |
|---|---|---|
| −1 | | The database associated with AAA is configured to allow token caching for user JOE. User Identification Information for JOE is configured to expire based on session expiration and a cache time-out value of "60". A CHAP password of "ABCD" is used to validate the connection. |
| 0 | user JOE submits a first request to establish a first session by supplying the NAS with the following information: username = "JOE" OTP = "1234" (from hand-held card) CHAP = "ABCD" | In this example, the AAA server currently has no cached information for user JOE. Thus, the AAA server communicates with a token server to verify the OTP "1234". The AAA server also validates the CHAP password "ABCD". |
| 1 | User JOE authenticates successfully. | Authentication is successful. The AAA server stores in its cache the username = "JOE" and the OTP = "1234". The AAA server also generates and stores session information that includes a session name of "JOE_Nas" and a task ID of "100". |
| 2 | User JOE starts a second PPP channel by submitting a second request to establish a second session by supplying the NAS with the following information: username = "JOE" OTP = "1234" CHAP = "ABCD" | The AAA server searches its cache and determines that it contains cached information for user JOE. Using JOE's cached information, the AAA server determines that the cache time-out value has not expired (time = 2 and cache time-out value = 60). The AAA server also determines that a session expiration has not occurred as a session ("JOE_Nas, task id 100") currently exists for user JOE. AAA server then Compares the submitted OTP with the cached OTP and authenticates the CHAP password. |
| 3 | User JOE gets a second PPP channel. | Authentication successful and the AAA server updates its cache information for user JOE, to now include session information: session =   JOE_Nas, task id 100       JOE_Nas task id 101 |
| 4 | User JOE terminates both of his PPP sessions. | After receiving notification that the sessions for user JOE have terminated, the AAA server updates its session information for JOE to indicate session = none. |
| 10 | User JOE reconnects to establish a PPP channel by submitting a request to establish a session by supplying the NAS with the following information: username = "JOE" OTP = "1234" | The AAA server searches its cache and determines that it contains cached information for user JOE. Using JOE's cached information, the AAA server determines that the cache time-out value has not expired (time = 10 and cache time-out value = 60). However, the AAA server determines that a session has expired because there are currently no sessions established for user JOE. The AAA server then communicates with the token server to authenticate the OTP = 1234. However, in this case, the OTP is determined invalid by the token server as it is no longer valid. |
| 11 | User JOE cannot connect | Authentication failed |

As indicated above, a set of cached user identification information may be configured to expire after the expiration of a cache time-out value. Table 2 illustrates an example of steps taken by a client and AAA server to result in the expiration of user identification information due to the expiration of a cache time-out value.

TABLE 2

| Time | Action by user or client | Action by AAA server |
|---|---|---|
| −1 | | The database associated with AAA is configured to allow token caching for user JOE. User Identification Information for JOE is configured to expire based on session expiration and a cache time-out value of "60". A CHAP password of "ABCD" is used to validate the connection. |
| 0 | user JOE submits a first request to establish a first session by supplying the NAS with the following information: username = "JOE" OTP = "1234" (from hand-held card) CHAP = "ABCD" | In this example, the AAA server currently has no cached information for user JOE. Thus, the AAA server communicates with a token server to verify the OTP "1234". The AAA server also validates the CHAP password "ABCD". |
| 1 | User JOE authenticates successfully. | Authentication is successful. The AAA server stores in its cache the username = "JOE" and the OTP = "1234". The AAA server also generates and stores session information that includes a session name of "JOE_Nas" and a task ID of "100". |
| 2 | User JOE starts a second PPP channel by submitting a second request to establish a second session by supplying the NAS with the following information: username = "JOE" OTP = "1234" CHAP = "ABCD" | The AAA server searches its cache and determines that it contains cached information for user JOE. Using JOE's cached information, the AAA server determines that the cache time-out value has not expired (time = 2 and cache time-out value = 60). The AAA server also determines that a session expiration has not occurred as a session ("JOE_Nas, task id 100") currently exists for user JOE. AAA server then Compares the submitted OTP with the cached OTP and authenticates the CHAP password. |
| 3 | User JOE gets a second PPP channel. | Authentication successful and the AAA server updates its cache information for user JOE, to now include session information: session = JOE_Nas, task id 100 JOE_Nas task id 101 |
| 65 | User JOE attempts to start a third PPP channel by supplying the NAS with the following information: username = "JOE" OTP = "1234" CHAP = "ABCD" | The AAA server searches its cache and determines that it contains cached information for user JOE. Using JOE's cached information, the AAA server determines that the cache time-out value has expired (time = 65 and cache time-out value = 60). The AAA server then communicates with the token server to authenticate the OTP = 1234. However, in the case, the OTP is determined invalid by the token server as it is no longer valid. |
| 66 | User JOE is denied the third session. | Authentication failed |

In another embodiment, a particular set of cached user identification information may be caused to expire after the expiration of an absolute time-out value. The absolute time-out value can be used to prevent "runaway" cached OTPs where the cache time-out value is not configured. In one embodiment, the absolute time-out value is automatically configured whenever the cache time-out value option is not selected. Table 3 illustrates an example of actions taken by a client and AAA server to result in the expiration of user identification information due to the expiration of an absolute time-out value.

TABLE 3

| Time | Action by user or client | Action by AAA server |
|---|---|---|
| −1 | | The database associated with AAA is configured to allow token caching for user JOE. User Identification Information for JOE is configured to expire based on session expiration but not based on a cache time-out value. However, the AAA server is configured with an absolute time-out of "1000" that will automatically cause any OTP to expire after "1000" units of time. A CHAP password of "ABCD" is used to validate the connection. |
| 0 | user JOE submits a first request to establish a first session by supplying the NAS with the following information: username = "JOE" OTP = "1234" (from hand-held card) CHAP = "ABCD" | In this example, the AAA server currently has no cached information for user JOE. Thus, the AAA server communicates with a token server to verify the OTP "1234". The AAA server also validates the CHAP password "ABCD". |
| 1 | User JOE authenticates successfully. | Authentication is successful. The AAA server stores in its cache the username = "JOE" and the OTP = "1234". The AAA server also generates and stores session information that includes a session name of "JOE_Nas" and a task ID of "100". |
| 100 | User JOE terminates his session, but due to a network error, the AAA server is not notified that JOE's session has terminated. | The AAA server does not know that the session for user JOE has been terminated. Thus, because the user identification information for JOE is not configured to expire based on a cache time-out value of "60" as in the previous examples, the OTP for user JOE is considered still valid. |
| 1001 | | The cached OTP for user JOE expires due to the expiration of the absolute timeout value. |

Figure 4:
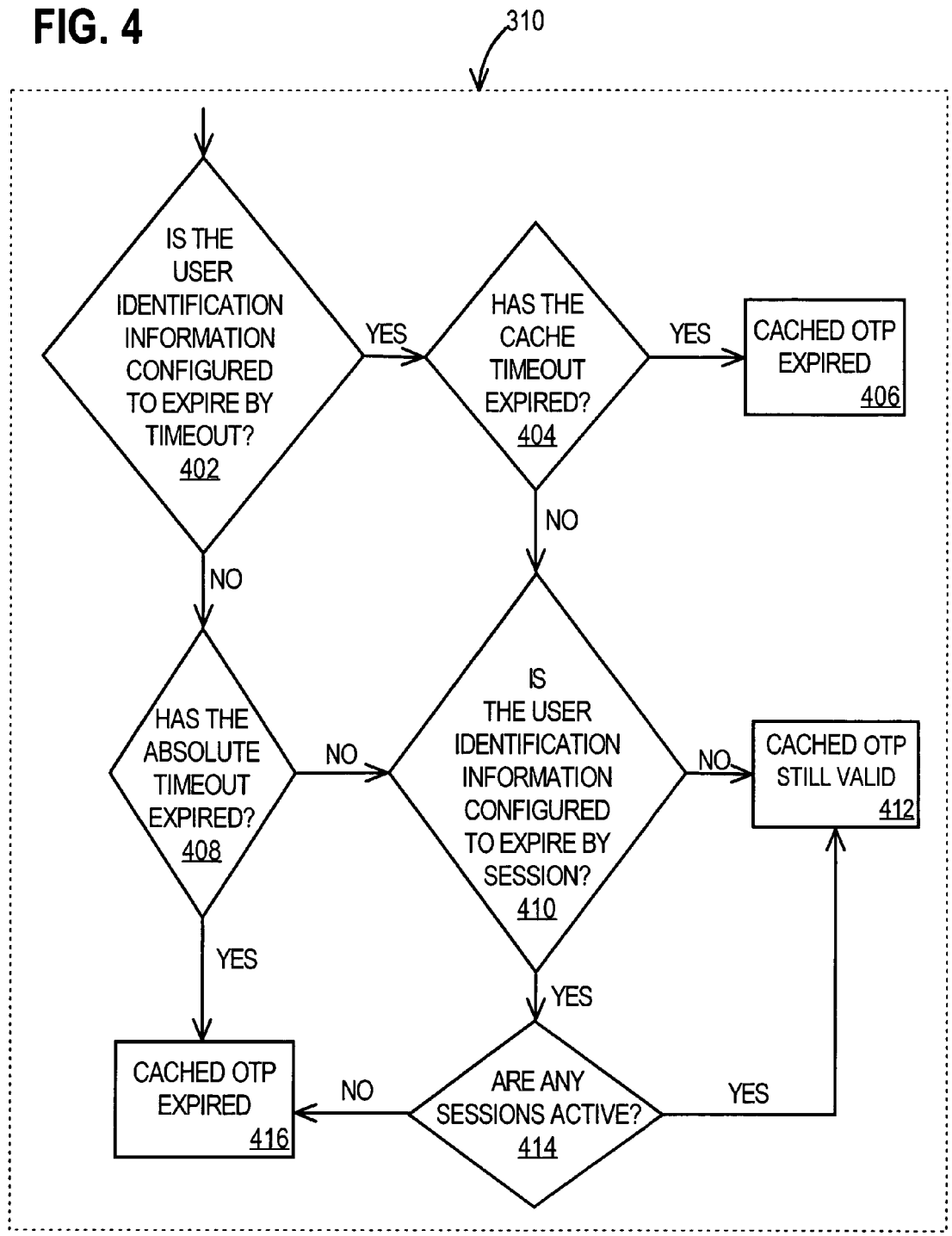
FIG. 4 is a flow diagram that illustrates a method of determining whether cached user identification information has expired.

FIG. 4 is a flow diagram that illustrates a method of determining whether cached user identification information has expired.

At block 402, a test is made to determine whether the user identification information is configured to expire by a cache time-out value. In one embodiment, a separate cache time-out value may be associated with each set of user identification information that is stored within the cache 130. Alternatively, a single cache time-out value, or certain groups of cache time-out values, may be associated with the different sets of user identification information.

If the user identification information is not configured to expire by a cache time-out value then control proceeds to block 408.

However, if the user identification information is configured to expire by a cache time-out value, at block 404 a test is made to determine whether the cache time-out value associated with the user identification information has expired. If the cache time-out value has expired, then at block 406 a flag is set to indicate that the OTP has expired.

Conversely, if the cache time-out value has not expired, then at block 410, a test is made to determine whether the user identification information is configured to expire by session expiration. If the user identification information is not configured to expire by session expiration, at block 412, a flag is set to indicate that the OTP is still valid.

However, if the user identification information is configured to expire by session expiration, at block 414, a test is made to determine whether there any active sessions based on the user identification information. If there are currently active sessions based on the user identification information, then at block 412 a flag is set to indicate that the OTP is still valid.

On the other hand, if there are not any currently active sessions based on the user identification information, then at block 416 a flag is set to indicate that the OTP has expired.

At block 408, a test is made to determine whether the absolute time-out value has expired, if the absolute time-out value has not expired, then control proceeds to block 410. Alternatively, if the absolute time-out value has expired, then at block 416 a flag is set to indicate that the OTP has expired.

Other Configurations

FIG. 1 and FIG. 2 depict a single network access server 104 connected to a single AAA server 126. However, in a preferred embodiment, a plurality of network access servers may connect to a single AAA server. In addition, in certain embodiments, a plurality of AAA servers are provided for connection by the network access servers.

In one embodiment, cached user identification information is not shared among the different AAA servers. Thus, if a network access server attempts to validate a OTP that it has cached on a different AAA server, the authentication will fail.

In certain embodiments, multiple AAA servers are configured to share a common area of memory that is used to cache user identification information. Thus, by accessing the shared common area of memory that is used to cache the user identification information, a particular AAA server may verify a cached OTP even though the OTP was originally cached in memory by a different AAA server.

Connection Types

Embodiments of the invention are not limited to any particular type of connection. For example, in certain embodiments, a dial-in connection may be established using one of the Internet's standard dial-in protocols such as the Point-to-Point Protocol (PPP) or the Serial Line Internet Protocol (SLIP). To prevent unauthorized network access, a "client" authentication phase may be performed before a client is allowed to connect to a network access server. During the client authentication phase, the particular client that is requesting a dial-in connection be established is identified.

For example, the PPP supports an optional client authentication phase by providing two authentication protocols, the Password Authentication Protocol (PAP) and the Challenge Handshake Authentication Protocol (CHAP). Both PAP and CHAP require that client password information be supplied to authenticate a client that is requesting to make a dial-in connection with a network access server. In particular, to authenticate the client, both PAP and CHAP require the client to provide "client access" information that can be used to determine whether the client is allowed to remotely connect to the network access server.

For example, if CHAP is used to establish the connection, the network access server sends a "challenge" message to the client. Upon receiving the challenge message, the client calculates a value based on the challenge message using a "one-way" hash function. The client then returns the calculated value back to the network access server. Upon receiving the calculated value, the network access server compares the value to its own calculation of the expected hash value. If the values match, the client is identified and a connection is made between the network access server and the client. A benefit with using CHAP is that it protects against unauthorized attacks as the challenge message value is varied from one authentication phase to the next. Once the client authentication phase is complete and the connection is made, the user authorization phase may be performed to determine whether a session should be established for the particular user.

Hardware Overview

Figure 5:
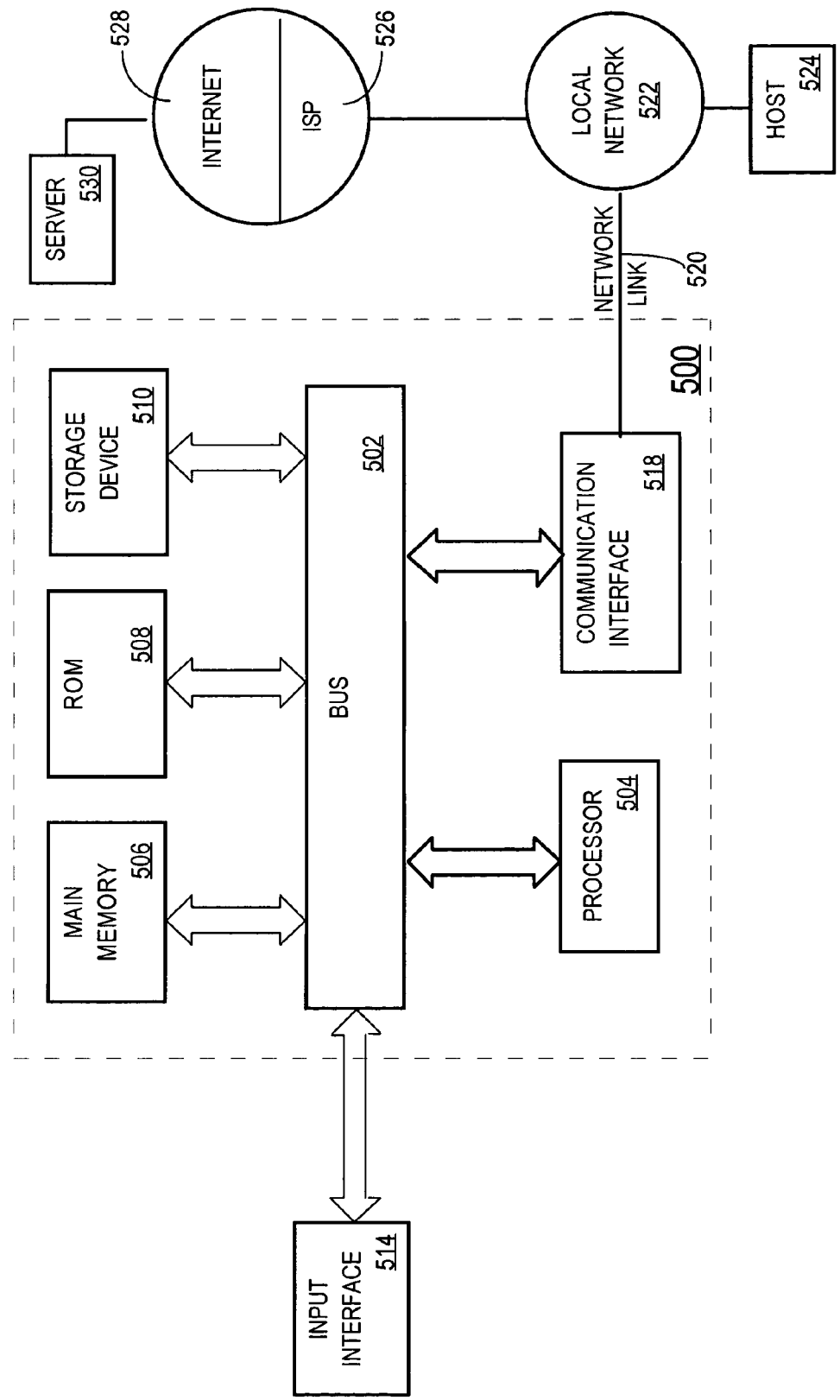
FIG. 5 is a block diagram of a computer system hardware arrangement that can be used to implement aspects of the invention.

FIG. 5 is a block diagram that illustrates a computer system 500 upon which an embodiment of the invention may be implemented. The preferred embodiment is implemented using one or more computer programs running on a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

An input interface 514 may be coupled to bus 502 for communicating information and command selections to processor 504. Input interface 514 is a conventional serial interface such as an RS-232 or RS-422 interface. An external terminal or computer system connects to the router or computer system 500 and provides commands to it using the input interface 514. Firmware or software running in the computer system 500 provides a terminal interface or character-based command interface so that external commands can be given to the computer system.

The invention is related to the use of computer system 500 for validating connections to a network system. According to one embodiment of the invention, the validating of connections to a network system is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for validating connections to a network system as described herein.

The received code may be executed by processor 504 as it is received, and/or stored in storage device 510, or other non-volatile storage for later execution. In this manner, computer system 500 may obtain application code in the form of a carrier wave.

In this configuration, the systems and methods of embodiments of the invention offer distinct advantages over past approaches. For example, authentication of a second channel occurs automatically; the user is not required to enter authentication information or authorization information a second time at the keyboard of the client. Also, token cards can be used in conjunction with hands-off devices, such as routers and other devices. Further, password security is improved. If a user saves a password and the password is compromised, the second authentication step of the invention renders the password useless.

Thus, in an exemplary embodiment, the initial link is established using CHAP. The user opens the link to traffic by authenticating with a Token card, which is highly secure. Additional links are added to the multilink bundle in a manner that is transparent to the user.

The static CHAP password resides in the router and need not be changed to accommodate one-time passwords. The user provides additional security by telnetting to the network access server and providing the one-time password.

Finally, even if the client computer or router is stolen, or the user's password is otherwise compromised, security is enhanced because the one-time password from the token card is initially required.

The invention is not limited to the context shown in drawing figures, and the spirit and scope of the invention include other contexts and applications in which the upgrade and diagnostic functions described herein are available to other mechanisms, methods, programs, and processes. For example, although personal computers have been used for illustrative purposes, other devices, such as workstations or Lap-top computers may be configured to perform the same functions. Thus, the specification and drawings are, accordingly, to be regarded in an illustrative rather than a restrictive sense.

What is claimed is:

1. A system comprising:
   one or more processors; and
   memory coupled to the processor, the memory containing one or more sequences of instructions for establishing sessions between a client and a server over a communications network, wherein execution of the one or more sequences of instructions by the one or more processors causes the processors to perform:
      receiving a first request to establish a first session between a client and a first server, wherein the request includes user identification information;

determining, based on the user identification information, whether the first session between the client and the first server should be established, and if so, authorizing the first session between the client and the first server, and causing the user identification information to be stored in a cache; and authorizing a second session between the client and the first server in response to a second request for the second session, based on the user identification information from the first request that is stored in the cache.

2. The system as recited in claim 1, wherein the user identification information includes a username and a one-time password (OTP), and wherein authorizing a second session comprises determining whether the OTP is valid at the time that the second request is received.

3. The system as recited in claim 2, wherein authorizing a second session comprises determining whether the username and the OTP are in the cache, and if the username and the OTP are not in the cache, generating a request that can be sent to a password server to determine whether the OTP is currently valid.

4. The system as recited in claim 2, wherein authorizing a second session comprises determining whether the username and the OTP are in the cache, and if the username and the OTP are not in the cache, determining whether the username and the OTP are still valid.

5. The system as recited in claim 4, wherein determining whether the username and the OTP are still valid comprises:

creating and storing a cached time value for the username and the OTP that indicates how long the username and the OTP have been stored in the cache; and comparing the cached time value with an expiration time-out value to determine whether the username and OTP are still valid.

6. The system as recited in claim 4, wherein the step of determining whether the username and the OTP are still valid comprises determining whether an active session currently exists between the client and the first server at the time of the second request.

7. The system as recited in claim 1, wherein the user identification information includes a username and a one-time password (OTP), and wherein authorizing the second session comprises:

generating instructions to a second server for determining whether the username and OTP are currently in a second cache of the second server; and generating a request to a password server to authenticate the OTP; and generating instructions to the second server for caching the username and the OTP in memory at the second server.

8. The system as recited in claim 1, wherein authorizing a second session comprises:

receiving the second request from the first server, wherein the second request includes user identification information that contains a username and a second one-time password (OTP);

determining whether the username and the second OTP correspond to user identification information stored in the cache, and if so, authorizing the second session between the client and the first server.

9. The system as recited in claim 1, wherein receiving a first request to establish a first session between the client and the first server comprises receiving a first request in a Challenge Handshake Authentication Protocol, and wherein the sequences of instructions cause the one or more processors to perform:

validating the client using the Challenge Handshake Authentication Protocol before authorizing the first session between the client and the first server.

10. The system as recited in claim 1, wherein receiving a first request to establish a first session between the client and the first server comprises receiving the first request in a Password Authentication Protocol, and wherein the sequences of instructions cause the one or more processors to perform:

validating the client using the Password Authentication Protocol before authorizing the first session between the client and the first server.

11. The system as recited in claim 1, wherein receiving a second request to establish a second session between the client and the first server comprises receiving the second request in a Challenge Handshake Authentication Protocol, and wherein the sequences of instructions cause the one or more processors to perform:

validating the client using the Challenge Handshake Authentication Protocol before authorizing the second session between the client and the first server.

12. The system as recited in claim 1, wherein receiving a second request to establish a second session between the client and the first server comprises receiving the second request based a Password Authentication Protocol, and wherein the sequences of instructions cause the one or more processors to perform:

validating the client using the Password Authentication Protocol before authorizing the second session between the client and the first server.

13. The system as recited in claim 1, wherein receiving a first request comprises receiving a one-time password that is generated by a Token card.

14. The system as recited in claim 13, wherein receiving a second request comprises receiving the same one-time password as received in the first request.

15. The system as recited in claim 1, wherein the sequences of instructions cause the one or more processors to perform:

establishing a first Point-to-Point (PPP) session between the client and the first server.

16. The system as recited in claim 1, wherein the sequences of instructions cause the one or more processors to perform:

establishing a first Serial Line Internet Protocol (SLIP) session between the client and the first server.

17. The system as recited in claim 1, wherein the sequences of instructions cause the one or more processors to perform:

establishing a first second Point-to-Point (PPP) session between the client and the first server.

18. The system as recited in claim 1, wherein the sequences of instructions cause the one or more processors to perform:

establishing a first second Serial Line Internet Protocol (SLIP) session between the client and the first server.

19. The system as recited in claim 1, wherein the first request includes a first username and a first one-time password (OTP) and the second request includes a second username and a second one-time password (OTP);

wherein storing the user identification information comprises storing the first username and the first OTP in a cache; and wherein authorizing the second session comprises determining that the second OTP corresponds to the first OTP that is in the cache.

20. The system recited in claim 1, wherein the sequences of instructions cause the one or more processors to perform:
identifying, based on a username from the user identification information, a set of access rights that is used by the first server in determining what may be performed by a user during the first session; and
transmitting the set of access rights to the first server.

21. A method comprising computer-implemented steps of:
determining, based on user identification information that is included in a first request to establish a first session between a client and a first server, whether the first session between the client and the first server should be established, and if so,
authorizing the first session between the client and the first server, and
causing the user identification information to be stored in a cache; and
authorizing a second session between the client and the first server in response to a second request for the second session, based on the user identification information from the first request that is stored in the cache.

22. The method recited in claim 21, wherein the first server is a network access server and the steps of determining, authorizing the first session, causing, and authorizing the second session are performed by an Authorization, Authentication, and Accounting server.

23. The method recited in claim 21, wherein the second request includes user identification information that contains a username and a second one-time password (OTP), and wherein authorizing a second session comprises:
determining whether the username and the second OTP correspond to user identification information stored in the cache, and if so, authorizing the second session between the client and the first server.

24. The method recited in claim 23, further comprising the computer-implemented step of receiving the second request from the first server.

25. The method recited in 21, wherein the user identification information includes a username and a one-time password (OTP), and wherein authorizing a second session comprises determining whether the OTP is valid at the time that the second request is received.

26. The method recited in claim 25, wherein authorizing a second session comprises determining whether the username and the OTP are in the cache, and if the username and the OTP are not in the cache, generating a request that can be sent to a password server to determine whether the OTP is currently valid.

27. The method recited in claim 21, wherein the user identification information includes a username and a one-time password (OTP), and wherein authorizing the second session comprises:
generating instructions to a second server for determining whether the username and OTP are currently in a second cache of the second server; and
generating a request to a password server to authenticate the OTP; and
generating instructions to the second server for caching the username and the OTP in memory at the second server.

28. The method recited in claim 27, wherein the second server is an Authorization, Authentication, and Accounting server.

29. The method recited in claim 21, further comprising the computer-implemented steps of:
identifying, based on a username from the user identification information, a set of access rights that is used by the first server in determining what may be performed by a user during the first session; and
transmitting the set of access rights to the first server.

30. A method comprising computer-implemented steps of:
receiving at a first server a first request to establish a first session between a client and the first server, wherein the first request includes first user identification information;
passing at least the first user identification information to a second server for use by the second server in determining whether the first session between the client and the first server should be established, and if so, authorizing the first session between the client and the first server, and for storing in a cache at the second server;
receiving at the first server a second request to establish a second session between the client and the first server, wherein the second request includes second user identification information;
passing at least the second user identification information to the second server for use by the second server in determining, based on the first user identification information that is stored in the cache and on the second user identification information, whether the second session between the client and the first server should be established, and if so, authorizing the second session between the client and the first server.

31. A computer-readable medium carrying one or more sequences of instructions which, when executed by one or more processors, cause the one or more processors to perform at least the steps of:
determining, based on user identification information that is included in a first request to establish a first session between a client and a first server, whether the first session between the client and the first server should be established, and if so,
authorizing the first session between the client and the first server, and
causing the user identification information to be stored in a cache; and
authorizing a second session between the client and the first server in response to a second request for the second session, based on the user identification information from the first request that is stored in the cache.

32. A computer-readable medium carrying one or more sequences of instructions which, when executed by one or more processors, cause the one or more processors to at least the steps of:
receiving at a first server a first request to establish a first session between a client and the first server, wherein the first request includes first user identification information;
passing at least the first user identification information to a second server for use by the second server in determining whether the first session between the client and the first server should be established, and if so, authorizing the first session between the client and the first server, and for storing in a cache at the second server;
receiving at the first server a second request to establish a second session between the client and the first server, wherein the second request includes second user identification information;
passing at least the second user identification information to the second server for use by the second server in determining, based on the first user identification information that is stored in the cache and on the second user identification information, whether the second session between the client and the first server should be established, and if so, authorizing the second session between the client and the first server.

33. A system comprising:
one or more processors; and
memory coupled to the processor, the memory containing one or more sequences of instructions which, when executed by the one or more processors cause the processors to at least the steps of:
  determining, based on user identification information that is included in a first request to establish a first session between a client and a first server, whether the first session between the client and the first server should be established, and if so,
  authorizing the first session between the client and the first server, and
  causing the user identification information to be stored in a cache; and
  authorizing a second session between the client and the first server in response to a second request for the second session, based on the user identification information from the first request that is stored in the cache.

34. The system recited in claim 33, wherein the first server is a network access server and the system comprises an Authorization, Authentication, and Accounting server.

35. The system recited in claim 33, wherein the second request includes user identification information that contains a username and a second one-time password (OTP), and wherein authorizing a second session comprises:
  determining whether the username and the second OTP correspond to user identification information stored in the cache, and if so, authorizing the second session between the client and the first server.

36. The system recited in claim 35, wherein the instructions cause the one or more processors to perform at least the step of receiving the second request from the first server.

37. The system recited in claim 33, wherein the user identification information includes a username and a one-time password (OTP), and wherein authorizing a second session comprises determining whether the OTP is valid at the time that the second request is received.

38. The system recited in claim 37, wherein authorizing a second session comprises determining whether the username and the OTP are in the cache, and if the username and the OTP are not in the cache, generating a request that can be sent to a password server to determine whether the OTP is currently valid.

39. The system recited in claim 33, wherein the user identification information includes a username and a one-time password (OTP), and wherein authorizing the second session comprises:
  generating instructions to a second server for determining whether the username and OTP are currently in a second cache of the second server; and
  generating a request to a password server to authenticate the OTP; and
  generating instructions to the second server for caching the username and the OTP in memory at the second server.

40. The system recited in claim 39, wherein the second server is an Authorization, Authentication, and Accounting server.

41. The system recited in claim 33, wherein the instructions cause the one or more processors to perform at least the steps of:
  identifying, based on a username from the user identification information, a set of access rights that is used by the first server in determining what may be performed by a user during the first session; and
  transmitting the set of access rights to the first server.

42. A system comprising:
one or more processors; and
memory coupled to the processor, the memory containing one or more sequences of instructions which, when executed by the one or more processors cause the processors to at least the steps of:
  receiving at a first server a first request to establish a first session between a client and the first server, wherein the first request includes first user identification information;
  passing at least the first user identification information to a second server for use by the second server in determining whether the first session between the client and the first server should be established, and if so, authorizing the first session between the client and the first server, and for storing in a cache at the second server;
  receiving at the first server a second request to establish a second session between the client and the first server, wherein the second request includes second user identification information;
  passing at least the second user identification information to the second server for use by the second server in determining, based on the first user identification information that is stored in the cache and on the second user identification information, whether the second session between the client and the first server should be established, and if so, authorizing the second session between the client and the first server.

* * * * *